United States Patent [19]

Kennedy

[11] Patent Number: 4,986,303

[45] Date of Patent: Jan. 22, 1991

[54] FAUCET ASSEMBLY

[76] Inventor: Christopher J. Kennedy, 7879 Eddy Rd., Colden, N.Y. 14033

[21] Appl. No.: 540,630

[22] Filed: Jun. 18, 1990

[51] Int. Cl.$^5$ .......................... F16K 37/00; E03C 1/02
[52] U.S. Cl. .................... 137/559; 137/606; 251/304
[58] Field of Search ............ 137/559, 603, 606; 251/208, 304, 341

[56] References Cited

U.S. PATENT DOCUMENTS

| 2,998,240 | 12/1961 | Liautaud | 137/606 X |
| 3,038,495 | 6/1962 | Fortin | 137/559 |
| 3,229,710 | 1/1966 | Keller, III | 137/606 X |
| 3,448,768 | 6/1969 | Keller, III | 137/606 |
| 3,870,075 | 3/1975 | Percival et al. | 137/606 |
| 4,785,845 | 11/1988 | Kochal | 137/606 X |

Primary Examiner—John Rivell
Attorney, Agent, or Firm—James J. Ralabate

[57] ABSTRACT

The faucet assembly of this invention has the usual water inlet and outlet lines. The novel portion of the faucet assembly is the visibly clear water conduits or tubes that are attached to the handles of the faucet assembly. These visibly clear tubes are in water flow connection with both the water inlet and outlet lines and therefore provide a way to determine most water flow problems in the assembly. In addition, these visibly clear tubes are aesthetically pleasing.

19 Claims, 2 Drawing Sheets

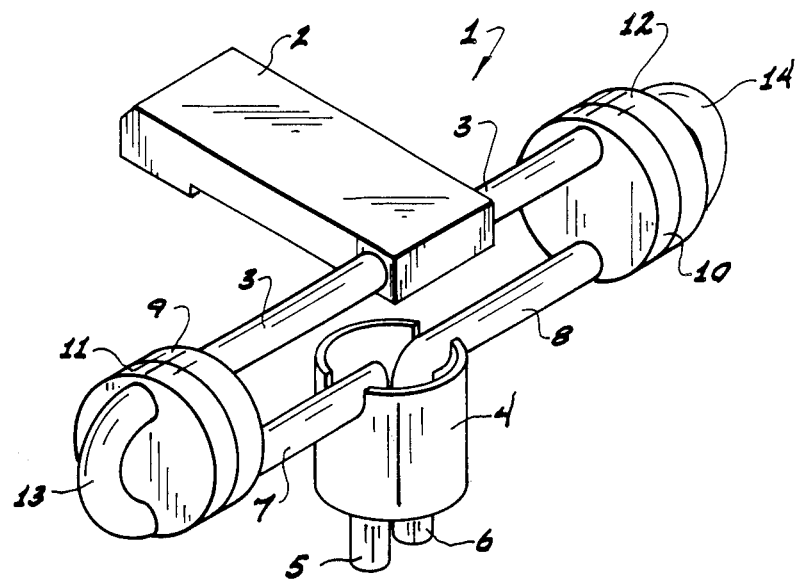
Fig. 1
Fig. 2
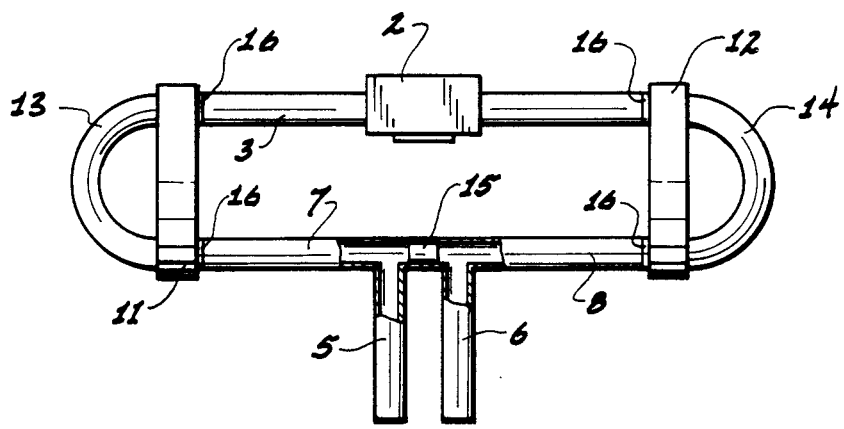

FAUCET ASSEMBLY

This invention relates to a faucet assembly and, more particularly, to a novel faucet structure having visual flow means therein.

BACKGROUND OF THE INVENTION

It is known to use various types of faucet assemblies for use in home sinks. Some are used in sinks in bathrooms, kitchens, laundry rooms and basements. Some of these faucet assemblies are relatively expensive because of their complex structure and construction. The more simple inexpensive structures lack eye appeal and often are difficult to install.

In addition, many ornamental faucet assemblies have been used which are both functional and appealing from a design aspect. Some of these ornamental faucets are disclosed in U.S. Design Pat. Nos. 141,718; 253,607; 291,114; 294,631 and 304,609. Most of these illustrate novel designs for faucets having both one and two handle means, each of a unique configuration. Most faucet assemblies are constructed of metal with plastic accessories, for example, plastic snap-on indicators for both hot and cold handles. In addition, there are some plumbing fixtures and faucet assemblies constructed of plastic such as those disclosed in U.S. Pat. No. 3,796,380 (Johnson). In Johnson, a plastic faucet assembly is constructed of plastic by injection molding. This type faucet has the advantage of providing spouts and faucets having complex shapes yet are composed of relatively few parts to be assembled to complete the fixture. Plastic construction also provides non-corrosive materials in faucet construction. Most faucet assemblies of the prior art are either aesthetically pleasing or simple in construction; few are both. Usually, eye appealing faucet assemblies are also complicated and detailed in construction.

Therefore, while most faucet assemblies are designed to be functional, they must also provide aesthetically pleasing designs to become competitive with existing structures. There is a need for more aesthetically appealing faucet assemblies that at the same time provide functional components and a relatively simple construction.

SUMMARY OF THE INVENTION

It is therefore an object of this invention to provide a faucet assembly devoid of the above-noted disadvantages.

Another object of this invention is to provide a novel faucet assembly that is aesthetically appealing and yet functional.

Another still further object of this invention is to provide a novel faucet assembly having visible water flow means integral therewith.

A yet another object of this invention is to provide see through handle means on a faucet to determine water flow in the structure.

Still a further object of this invention is to provide a faucet structure having transparent tubes as part of the handle means.

Another yet further object of this invention is to provide a simply constructed, efficient and aesthetically pleasing faucet assembly.

Yet still another object of this invention is to provide a faucet assembly having novel handle means with visibly clear water flow conduits therein.

These and other objects of this invention are accomplished by this invention by providing a faucet assembly comprising a spout or tap member through which water will flow. In water flow connection with this spout are two disk-like movable or rotatable handles, one for hot water flow control and the other for cold water flow control. Projecting outwardly from each of said disk-like handles are clear glass or plastic tubular semi-circles. These clear tubular semi-circles (or arc or any part circular configuration) are in water flow connection with the source of water thereby allowing water to flow through these clear tubes to not only provide an attractive faucet means but also to indicate when any water flow problems exist. For example, if water is not seen flowing through these tubes, it is obvious that the water flow problem exists somewhere in the system before the clear tubes. These clear tubes may be used directly on a disk-like handle or in lieu thereof they may be used adjacent a movable or rotatable handle in a fixed position. The critical element is that irrespective of their placement, the clear tubes must be in water flow connection with the source of water and the spout or tap. By "tubes" is meant throughout this disclosure any element of the faucet handles that show the flow of water therethrough. In operation, water will enter the system in an inline water supply pipe (or pipes, one hot, one cold) through the respective hot or cold inlet pipes connected to the faucet, then up to the handle portions. By slightly turning the handles to the open positions, water will flow through the clear plastic or glass tubes, through the spout feed pipe and out of the spout. The water can clearly be seen continuously flowing through the clear tubes as it also pours out the spout. The clear tubes will be mounted in one embodiment on a movable disk-like handle. The tube openings will be contiguous with openings in the disk-like handle. When the handle is turned these openings will be aligned with the water pipe thus allowing the water to flow into and through the clear tubes. Once the appropriate handle is turned, i.e. hot or cold, only the hot or cold (or both, if both handles turned) will flow through the clear tubes and out the spigot or spout. A drain plug may or may not be included in the assembly of this invention. If a drain plug is to be used it would be positioned in the usual or conventional location on the assembly.

BRIEF DESCRIPTION OF THE DRAWINGS

FIG. 1 is a side perpsective view of the faucet assembly of this invention.

FIG. 2 is a top fragmentary view of the faucet assembly of this invention.

DESCRIPTION OF THE DRAWING AND PREFERRED EMBODIMENT

Figure 3:
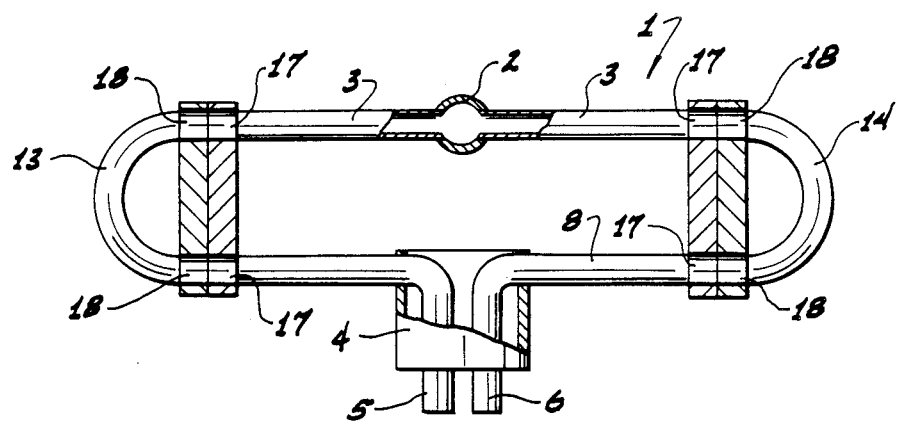
FIG. 3 is a front plan view of the faucet assembly of this invention.

In FIG. 1 a side perspective view of the faucet assembly 1 of this invention is shown. The assembly 1 comprises a spout or tap 2 in water flow connection to an outlet pipe 3. A water source pipe 4 feeds water into the faucet assembly through a hot water inlet pipe 5 and a cold water inlet pipe 6, each pipe 5 and pipe 6 is in water flow connection with water feed pipes or conduits 7 and 8, respectively. Obviously, the hot water inlet pipe 5 and cold water inlet pipe 6 can be alternatively located on either side of the top 2. The water then flows through feed pipes 7 and 8 to a stationary plate or disk 9 and 10, respectively. These stationary disks 9 and 10 have apertures contiguous with the pipe 7 and 8 openings that enter the disks 9 and 10 (see FIG. 5). Adjacent each disk 9 and 10 is a rotatable handle 11 and 12, respectively, that also has apertures therein (see FIG. 6). The apertures in handles 11 and 12 are contiguous with the openings of clear tubes 13 and 14 permitting water to flow therethrough when handle apertures are in alignment with stationary disk apertures. Alternatively, rotatable handles 11 and 12 may be in direct contact with water feed pipes 7 and 8 being sure that an appropriate water sealing means or gasket was positioned therebetween to avoid leaking when handle apertures were not in alignment with openings in pipes 7 and 8 or outlet pipe 3. FIG. 2 illustrates the embodiment where the stationary plate or plates 9 and 10 (preferred embodiment) are not used. In FIG. 1 water flows through hot water inlet pipe 5 and cold water flows through cold water inlet pipe 6 into water feed pipes 7 (hot water) and pipe * (cold water) through the apertures in stationary plates 9 and 10, respectively, through aligned apertures in rotatable handles 11 and 12 (when apertures are aligned) into tubes 13 and 14, through tubes 13 and 14 into outlet pipe 3 (which has aligned apertures in plates 9 and 10 with apertures in rotatable handles 11 and 12. The water then flows continuously through outlet pipe 3 and out spout 2.

In FIG. 2 a top cutaway or fragmentary view of the faucet assembly o this invention is shown. Water inlet pipes, hot water inlet pipe 5 and cold water inlet pipe 6 are shown supplying water to hot water feed pipe 7 and cold water feed pipe 8. Separating compartments of feed pipes 7 and 8 is a sealed separation plug 15 which ensures that only hot water flows through pipe 7 and cold water through pipe 8. Water then flows to an aligned apertyre in handle 11 and through the visibly clear plastic tube 13. From there the water flows through aligned apertures in the top of rotatable handle 11 and in outlet pipe 3 through and out of spout 2. The water flow is the same through cold water inlet pipe 6, water feed pipe 8, rotatable handle 12, clear tube 14 and outlet pipe 3 to spout 2. In the embodiment shown in FIG. 2 a watertight seal 16 is positioned between rotatable handles 11 and 12 and pipes 3 and 7 and 8 in order to provide waterproofing when the apertures in handles 11 and 12 are in and out of alignment with the openings in pipes, 7 and 8. These same seals 16 may be used in the embodiment of FIG. 1, if desirable. FIG. 1 and FIG. 2 embodiments are the same except in the structure of FIG. 2 stationary plates are omitted.

In FIG. 3 the structure of the faucet assembly of FIG. 1 is shown from a front plan view. The water inlet pipes 5 and 6 supply the water to the system or assembly 1. When the apertures 17 that go through the thickness of stationary plates 9 and 10 are aligned with apertures 18 (that go through the thickness of handles 11 and 12) in rotatable handles 11 and 12, the water freely flows through the system and out of spout 2. When handles 11 and 12 are turned in the off position, apertures 18 are out of alignment or registration with apertures 17 and the water flow is stopped. The flow through visible tubes 13 and 14 permit the user to determine the location of flow problems either before or after the tubes 13 and 14 when the stream of water is not emerging from the spout 2. A seal 16 may be used between the rotatable handles 11 or 12 and stationary disks or plates 9 and 10, if desired. In the embodiment of FIGS. 1 and 3 tubes 3, 7 and 8 are fixed to stationary disks 9 and 10 in any suitable watertight manner such as welding, soldering or the like.

Figure 4:
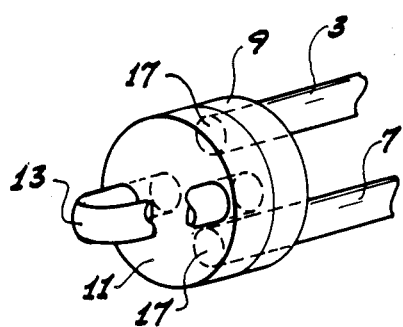
FIG. 4 is a perspective view of the rotatable disk-like handle with the clear tube openings out of alignment with the water feed and water outflow tubes.

In FIG. 4 the assembly of the stationary disk 9, rotatable handle 11 and visible clear plastic tube 13 is shown as they interact with each other. Stationary disk 9 is in water flow connection with outlet pipe 3 and feed pipe 7. The apertures 17 in stationary disk 9 are out of alignment with the apertures 18 in movable handle 11 (contiguous with tube 13 openings) as shown in FIG. 4. Therefor, no water will flow through tube 13 or out of spout 2. The handle 12 and disk 10 on the other side will be identical to handle 11 and disk 9. When handle 11 is turned so that tube openings and apertures 18 are in registration or alignment with apertures 17, the water flow will progress.

Figure 5:
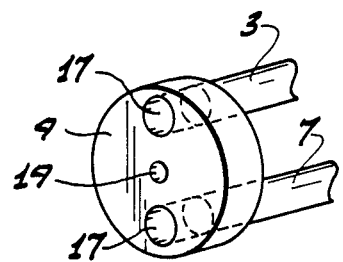
FIG. 5 shows the stationary disk or plate that is attached to inlet and outlet pipes.

In FIG. 5 the stationary plate 9 is shown connected to tubes 3 and 7 and in water flow alignment therewith. Note that apertures 17 in stationary plate 9 are contiguous with pipes 3 and 7. Central core opening 19 in plate 9 will accommodate any axle or turn means for movement of rotatable plates 11 and 12. Any suitable known means to rotate plates 11 and 12 may be used. Plates 9 and 10 and rotatable handles 11 and 12 may be constructed of any suitable, durable material such as metal, plastic, fiberglass, wood etc. All tubing or pipes except for the clear tubes 13 and 14 are made from conventional metals or plastics. Clear tubes 13 and 14 are clear, transparent plastic or glass tubes made from known materials such as polyvinylchloride, polystyrene and the like. It is important that the materials used for clear tubes 13 and 14 be chemically inert and will not react in any fashion with water both hot and cold.

Figure 6:
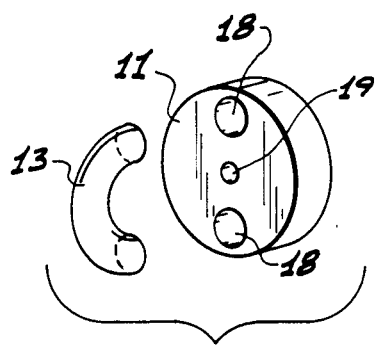
FIG. 6 is a perspective view of the movable or rotatable handle with the tubes attached thereto.

In FIG. 6 the construction of rotatable handles 11 and 12 is shown as tubes 13 and 14 are water tightly attached thereto. The apertures 18 in rotatable handles 11 and 12 are contiguous with the tube 13 end openings to allow the water to flow therethrough when apertures 18 are aligned with apertures 17 in the stationary disk 9. While the FIGS. 4, 5 and 6 show only with the handle 11 side of the faucet assembly 1, the other side (handle 12) is identical thereto. Obviously, using only one handle with a clear tube to show water flow rather than two handles with two handles and to clear tubes is within the spirit of this invention.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A faucet assembly comprising in combination the following elements: at least one water inlet source, water feed conduits leading to faucet handles, rotatable faucet handles, visibly clear means attached to said handles and in water flow connection therewith, and water outlet means that carry water away from said handles and said visibly clear means to a water spout.

2. The faucet assembly of claim 1 wherein said water inlet source comprises two pipes, one to carry hot water and one to carry cold water to the water feed conduits.

3. The faucet assembly of claim 1 wherein said water feed conduits comprise a hot water feed conduit and a cold water feed conduit.

4. The faucet assembly of claim 1 wherein said rotatable faucet handles have a disk-like construction with two apertures extending therethrough each of said apertures being in water flow arrangement on one face of said handle with ends of said visibly clear means and said apertures being movable on an opposite face of said handle to a position in alignment with said water feed conduits and said water outlet means.

5. The faucet assembly of claim 1 wherein said visibly clear means are tubes that have an arc-like configuration, each end of said arc-like configuration terminating in a water flow relationship with apertures in said faucet handles.

6. The faucet assembly of claim 1 wherein said visibly clear means are tubes having a semi-circular configuration, each end of said semi-circular configuration terminating in a water flow relationship with apertures in said faucet handles.

7. The faucet assembly of claim 1 wherein said water outlet means comprises two outlet pipes, one to carry hot water and the other outlet pipe to carry cold water to said water spout.

8. The faucet assembly of claim 1 wherein all of said elements are in water flow relationship with all other elements.

9. The faucet assembly of claim 1 wherein a stationary disk-like plate with two apertures is positioned between said feed conduits and said rotatable faucet handles, said faucet handles have two apertures that can be movably aligned with said two apertures in said stationary disk-like plate to thereby allow water to flow therethrough.

10. A faucet assembly comprising in water flow connection the following elements: at least one water inlet source, two water feed conduits extending to faucet handles, rotatable faucet handles, visibly clear tubes attached to said faucet handles, and water outlet means adapted to carry water from said handles and said tubes to a water spout, said visibly clear tubes having two terminal portions contiguous with apertures in said rotatable faucet handles, said apertures in said faucet handles extending through the handles and in movable alignment with said two water feed conduits.

11. The faucet assembly of claim 10 wherein said water inlet source comprises two pipes, one to carry hot water and one to carry cold water to the water feed conduits.

12. The faucet assembly of claim 10 wherein said water feed conduits comprise a hot water feed conduit and a cold water feed conduit.

13. The faucet assembly of claim 10 wherein said rotatable faucet handles have a disk-like construction with two apertures extending therethrough, each of said apertures being in water flow arrangement on one face of said handle with ends of said visibly clear tubes and said apertures being movable on an opposite face of said handle to a position in alignment with said water feed conduits and said water outlet means.

14. The faucet assembly of claim 10 wherein said visibly clear tubes have an arc-like configuration, each end of said arc-like configuration terminating in a water flow relationship with apertures in said faucet handles.

15. The faucet assembly of claim 10 wherein said visibly clear tubes have a semi-circular configuration, each end of said semi-circular configuration terminating in a water flow relationship with apertures in said faucet handles.

16. The faucet assembly of claim 10 wherein said water outlet means comprises two outlet pipes, one to carry hot water and the other outlet pipe to carry cold water to said water spout.

17. The faucet assembly of claim 10 wherein all of said elements are in water flow relationship with all other elements.

18. The faucet assembly of claim 10 wherein a stationary disk-like plate with two apertures is positioned between said feed conduits and said rotatable faucet handles, said faucet handles have two apertures that can be movably aligned with said two apertures in said stationary disk-like plate to thereby allow water to flow therethrough.

19. The faucet assembly of claim 10 wherein all of said elements are in water flow relationship with all other elements when said rotatable faucets have their apertures in alignment with said two water feed conduits.

* * * * *